US010691736B2

United States Patent
Castelli et al.

(10) Patent No.: US 10,691,736 B2
(45) Date of Patent: Jun. 23, 2020

(54) CONTEXTUALIZED ANALYTICS PLATFORM

(71) Applicant: International Business Machines Corporation, Armonk, NY (US)

(72) Inventors: Vittorio Castelli, Croton On Hudson, NY (US); Georgiana Dinu, White Plains, NY (US); Radu Florian, Danbury, CT (US); Gourab Kundu, White Plains, NY (US); Taesun Moon, Scarsdale, NY (US); Avirup Sil, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 14/865,429

(22) Filed: Sep. 25, 2015

(65) Prior Publication Data

US 2017/0091626 A1    Mar. 30, 2017

(51) Int. Cl.
*G06F 16/335* (2019.01)
*G06Q 30/02* (2012.01)

(52) U.S. Cl.
CPC .......... *G06F 16/335* (2019.01); *G06Q 30/02* (2013.01)

(58) Field of Classification Search
CPC ........ G06N 5/04; G06N 99/005; G06C 30/02; G06C 30/0261; H04W 12/06; G06Q 30/02; G06Q 30/0261; G06F 16/335
See application file for complete search history.

(56) References Cited

U.S. PATENT DOCUMENTS

| 7,975,308 | B1 | 7/2011 | Satish et al. |
| 9,280,252 | B1* | 3/2016 | Brandmaier ........... G06Q 40/08 |
| 2002/0120864 | A1 | 8/2002 | Wu et al. |
| 2007/0192300 | A1* | 8/2007 | Reuther .............. G06F 16/2452 |
| 2008/0141337 | A1 | 6/2008 | Yeung et al. |
| 2009/0287687 | A1 | 11/2009 | Martire et al. |
| 2009/0327296 | A1 | 12/2009 | Francis et al. |
| 2010/0077489 | A1 | 3/2010 | Ake |
| 2010/0274645 | A1 | 10/2010 | Trevithick et al. |
| 2011/0040756 | A1 | 2/2011 | Jones et al. |
| 2012/0116831 | A1 | 5/2012 | Greenspan et al. |
| 2013/0006904 | A1 | 1/2013 | Horvitz et al. |
| 2013/0332362 | A1 | 12/2013 | Ciurea |
| 2014/0007222 | A1 | 1/2014 | Qureshi et al. |
| 2014/0032259 | A1 | 1/2014 | LaFever et al. |
| 2014/0032452 | A1 | 1/2014 | Perkowitz et al. |
| 2014/0095487 | A1* | 4/2014 | Kurz .................. G06Q 30/0631 707/722 |

(Continued)

OTHER PUBLICATIONS

Mell et al., "The NIST Definition of Cloud Computing", National Institute of Standards and Technology, Special Publication 800-145, Sep. 2011, pp. 1-7.

(Continued)

*Primary Examiner* — Alan Chen
*Assistant Examiner* — Brent Johnston Hoover
(74) *Attorney, Agent, or Firm* — L. Jeffrey Kelly

(57) ABSTRACT

An analytics engine operates on data associated with users and opportunities. A broker system provides the opportunity data to the analytics engine, but the analytics engine does not provide user data to the broker system. The analytics engine notifies users of results of analytics operations.

18 Claims, 7 Drawing Sheets

(56) References Cited

U.S. PATENT DOCUMENTS

| | | | |
|---|---|---|---|
| 2014/0279007 A1* | 9/2014 | Srinivasan | G06Q 30/0261 705/14.58 |
| 2015/0019338 A1* | 1/2015 | Sotomayor | G06Q 30/0261 705/14.55 |
| 2015/0120453 A1 | 4/2015 | Lee et al. | |
| 2015/0244779 A1* | 8/2015 | Fitzgerald | H04L 67/306 705/2 |
| 2015/0372808 A1* | 12/2015 | Bilogrevic | G06N 7/005 380/279 |

OTHER PUBLICATIONS

IBM, List of IBM Patents or Patent Applications Treated as Related, Appendix P, dated Feb. 18, 2015, 2 pages.

Pending U.S. Appl. No. 15/045,433, filed Feb. 17, 2016, Entitled:"Contextualized Analytics Platform", 36 pages.

* cited by examiner

CONTEXTUALIZED ANALYTICS PLATFORM

BACKGROUND

Embodiments of the invention generally relate to data analytics systems, and more particularly, to providing contextualized analytics to users while maintaining data privacy.

Cloud-based software applications make great use of user devices including, for example, mobile devices. These mobile devices often store private data. Private data may include, for example, financial records, calendars, communication history, social platform data, and other data. The mobile devices may also store time and location information about each of these private data types. This private data may be sensitive, and may be misused if compromised. The mobile device may also store information on how to access sensitive data stored by third parties, for example in credit card accounts, investment accounts, bank accounts, medical accounts.

Data analytics engines may use data, such as the private data described above, to make recommendations to a user that are tailored to the user's data.

SUMMARY

Embodiments of the invention provide for a method, system, and computer program product for securitizing analytics services provided in a computing environment.

According to an embodiment of the invention, a method receives, via an analytics engine, electronic data associated with a user. The electronic data includes a set of user characteristics including at least one category having at least one value. The method receives, via the analytics engine, from a data broker system, a set of electronic records including at least one category having at least one value. The method identifies similarities between the plurality of user characteristics and the plurality of electronic records based on their respective categories and values. The analytics engine does not provide the data broker system information identifying the user.

DETAILED DESCRIPTION

Figure 1A:
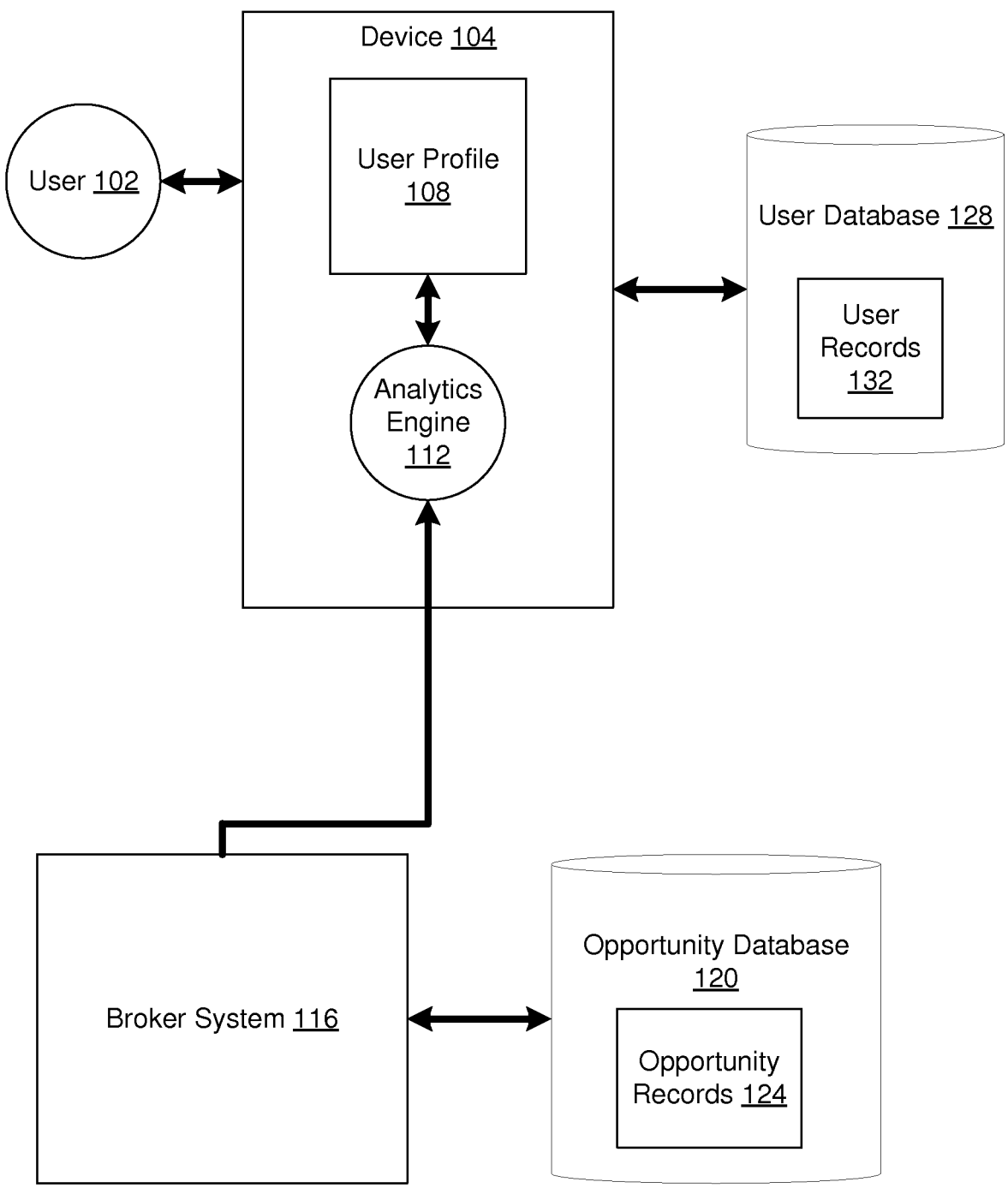
FIG. 1A is a block diagram of a first computing environment for providing securitized analytics services, according to an embodiment of the invention.

Embodiments of the invention include methods, systems, and computer program products for providing data security in analytics services available to a user. Generally, the analytics services may match users to opportunities. Generally defined, an opportunity refers to an available activity that a user performs, or an available interaction that the user may have with another user, or a combination thereof. An analytics engine may match a user to an opportunity based on receiving data associated with them. The matching may be based on similarities and differences between user characteristics and opportunity characteristics.

Data associated with the user ("user data") generally may include user characteristics, traits, personality information, and other types of data. User data may include, for example, demographics, habits (for example, shopping, travel, or dining habits), and preferences. User data may also include time and location information.

User data generally may include data that is traceable to a user ("traceable user data"), and data that is non-traceable to the user ("non-traceable user data"). Traceable user data is data that can be used to identify the user with which it is associated. An example of traceable user data is a user's social media postings that includes the user's username. Non-traceable user data is data that cannot directly be used to identify the user with which it is associated. An example of non-traceable user data is the name of a product that a user has purchased, without any data/metada indicating that the product is associated with the user.

User data may be collected from a variety of data sources, including publically and privately available data sources. Public data may include, for example, information available on the Internet, public databases, or other information. Private data may include, for example, banking transaction data, social media profile and postings, online reviews and profiles associated with online accounts, user calendars, email, digital documents. In one embodiment, user data may be stored as user records 132 on user database 128.

Data associated with the opportunity ("opportunity data") generally may be opportunity characteristics, properties, features, and other types of data. Opportunity data may include, for example, availability, suitability for a particular set of user demographics, habits, or preferences; it may also include aspects like pricing, promotional value, and other properties. Opportunity data may also include time and location information.

Opportunity data may be collected from a variety of data sources including, for example, data generated by businesses (for example, a business can generate opportunity records that describe characteristics associated with opportunities that the business provides its customers). In one embodiment, opportunity data may be stored as opportunity records 124 on opportunity database 120.

An analytics engine may match a user to an opportunity based on analysis of their respective associated data. In one example, the matching may be based on similarities between the user data and the opportunity data (for example, a user who likes coffee may be matched to an opportunity to purchase a popular coffee blend, offered by a coffee shop, at a discounted price). In another example, the matching may be made based on dissimilarities between the two (for example, the user who likes coffee may be matched to an opportunity to purchase a new energy drink, something that the user has never tried, with the goal of exposing the user to a new opportunity).

Maintaining user privacy and data security, while providing the above described analytics services, is a challenge addressed by aspects of the present invention. A particular challenge is that systems that provide analytics services based on user data and opportunity data are often owned and operated by businesses. Users often must give up control of their data to these businesses in exchange for using their analytics services. This risks user privacy.

Embodiments of the invention address the need for user privacy in providing analytics services by, in part, by implementing a system and method whereby computing resources that perform analytics services, which have access to user data, are quarantined relative to computing resources that collect opportunity data. The components that have access to user data are within user control. Components that have primary access to opportunity data are subservient (in terms of access control) to user-controlled components.

FIG. 1A is a block diagram of a computing environment 100A for providing data security in analytics services, according to an embodiment of the invention. Generally, computing environment may include one or more users 102 interacting with one or more computing devices, via a network, to exchange data. The devices in computing environment 100A may individually, or in combination, execute a method to securely provide analytics services to the one or more users. Computing devices in computing environment 100A are discussed according to some of their functions that highlight their role in maintaining data security when providing analytics services. Additional details of the structure and capabilities of these computing devices are provided below in connection with FIG. 3.

Referring now to FIG. 1A, computing environment 100A includes device 104. Device 104 may be an electronic device associated with a user 102. Device 104 may be, for example, a mobile device (such as a smartphone or tablet), associated with user 102. User 102 may be, for example, a natural person. Additional details of the structure of device 104, according to embodiments of the invention, are discussed in connection with FIG. 3, below.

Device 104 may be operatively connected to user database 128 storing user records 132. User records 132 may be electronic records containing user data, as defined above. User database 128 may be a tangible storage device, and may be an internal or external component of device 104. User database 128 may also be remotely connected to device 104.

It should be noted storing user data on user database 128 is not necessary to practice embodiments of the invention. User data may be scattered across a variety of data sources, and may be monitored and/or collected once, or periodically, by analytics engine 112, to generate a user profile and/or a user model.

A user profile need not be something that is storable in a traditional database record. In one embodiment, a user profile may be a statistical model or a collection of interrelated statistical models that can be used to predict user behavior, specifically as it pertains to interest in available opportunities. A statistical model here may include a collection of feature extraction functions, and one or more function that takes as input the features produced by the feature extractors and produces a categorical decision or a numeric output (the first function would be called a classifier, the second a regression function).

In some instances, it may be undesirable to store explicitly a user model as data about the user, because of possible security and trust concerns. A user model, on the other hand, would be effectively equivalent to a program, which might be impossible to reverse-engineer to actually extract information about the user.

In some embodiments, for security purposes, an analytics engine that creates the user profile would access the user information either once or periodically, as instructed from the system), without maintaining any explicit information about the user in any place.

Therefore, although embodiments of the invention described herein may refer, from time to time, to a user profile, they may function without an explicit user profile.

Device 104 may store a user profile 108 associated with user 102. User profile 108 may generally store user data; data associated with user 102. In one example, user profile 108 may include the following data regarding user1:

user1.gender=male;
user1.age=40
user1.location.morning=location_A
user1.location.afternoon=location_B
user1.last_n_purchases=array$_1$
user1.last_vacation=destination_X In this example, user1 may be a forty-year-old male who frequently (for example, twice a week) visits location_A (for example, a coffee shop) in the mornings, and location_B (for example, a grocery store) in the afternoons. user1 may have made a number purchases using his credit card; this information may be stored in array$_1$. user1 may have taken his most recent vacation at destination_X, which may be, for example, a tropical resort.

Device 104 may also include, or be operatively connected to, analytics engine 112. Analytics engine 112 may be a combination of hardware and software resources that generally receives information from a broker system 116, and matches one or more of the received information to user profile 108.

Broker system 116 may be a combination of hardware and software (described in greater detail in connection with FIG. 3, below) that may generally serve as an interface between analytics engine 112, which has access to user profile 108, and opportunity records 124. Among the functions of broker system 116 may be to: receive opportunity data from a local or remote data source, such as opportunity records 124 stored on opportunity database 120; receive queries whose parameters specify aspects of opportunity records (such as keywords, tags, or other attributes) to search for in opportunity database 120; communicate all or some of the opportunity records 124 available to broker system 116; and other functions.

Although embodiments of the invention discuss using opportunity database 120, it should be noted that this is not necessary. In some embodiments, broker system 116 may issue web searches in response to requests from analytics engine 112. Since there may be numerous users making requests at any point in time, and since all the searches may come from the same broker, it may be exceedingly difficult for a third party to match queries with individuals, and therefore this embodiment still has the required privacy characteristics, without the need for an opportunity database.

A feature of the configuration of computing environment 100A, according to embodiments of the invention, is that user records 132 and opportunity records 124 are maintained separately on separate databases. Analytics engine 112 can access all or a subset of opportunity records 124 stored on opportunity database 120 in collaboration with broker system 116, but broker system 116 cannot access user records 132 on user database 128.

Access control measures for each component may be implemented using known access control measures. For example, accessing user records 132 may require authentication using a key available to analytics engine 112, but not available to broker system 116.

According to an aspect of the invention, broker system 116 is separate from device 104 containing analytics engine 112. However, analytics engine 112 may operate on the same device as, or on a device different from, device 104. Device 104 and analytics engine 112 are configured in such a manner that they do not transmit user profile 108 data to broker system 116; whereas broker system 116 transmits opportunity data to analytics engine 112 via device 104 or another device on which analytics engine 112 operates.

One advantage of the above-described configuration of computing environment 100A is separation between user data and opportunity data.

For example, consider the following scenario: device 104 is a mobile device owned by user 102. Device 104 locally builds user profile 108 over time as user 102 uses and interacts with device 104. For example, when user 102 uses device 104 to make an at-the-point-of-sale purchase, device 104 updates user profile 108 with the transaction information (and may further add time and location information). The transaction information may be stored locally or remotely, and may be accessible through a mobile application executable on device 104. Analytics engine may analyze the stored transaction information over time to build a behavior model for user 102 that recognizes patterns in the user's spending behavior. For example, analytics engine 112 may determine that user 102 purchases coffee from a coffee shop every weekday on route from the user's home address to the user's office address. In embodiments where user profile 108 does not consist of raw data in a database, but rather is a user model (a collection of statistical models about user behavior), the user model may be generated and updated on a cloud-computing platform.

Several opportunities may be suitable for the user based on this spending behavior. For example, a new coffee shop may have opened along the route that user 102 travels. The user may be interested in learning about the opportunity to purchase coffee from the new coffee shop.

Continuing with the above example, under traditional analytics service models, device 104 may be required to communicate, directly or through a software/hardware intermediary, the user data it has collected to a remote server hosting an analytics engine. The remote server's analytics engine would, in the traditional scenario, identify opportunities suitable for user 102, and communicate them to device 104 for presentation to the user. A fundamental flaw of this approach is that the remote analytics engine is not under the user's control, and receives information about the user that the user may wish to keep private.

Consider, also, the following example: every time a user searches the Internet using a search engine, the search engine provider gathers user information. A simple indication of this is that if the user researches an item on an online retailer's website, and then goes on to visit other webpages, advertising for that item start appearing on many of those other webpages as the user navigates them. It is preferable, therefore, to have an analytics engine that has a detailed model of the user based on information that the user does not want to divulge directly or indirectly, and to ensure that search providers and goods/service providers do not get to know any of that information, even indirectly.

Continuing with the above example, in connection with embodiments of the invention, device 104 does not communicate user data to a remote server or to any component not within the user's control. Instead, the flow of information is in the opposite direction, via broker system 116. Whether broker system 116 is a remote computing system (for example, a server) or a local component of device 104, its access credentials do not allow it to access user data (including user profile 108 and as user records 132, stored locally or remotely). Rather, broker system communicates opportunity records 124 to analytics engine, which performs desired analysis on the data and recommends a matching to the user.

Figure 1B:
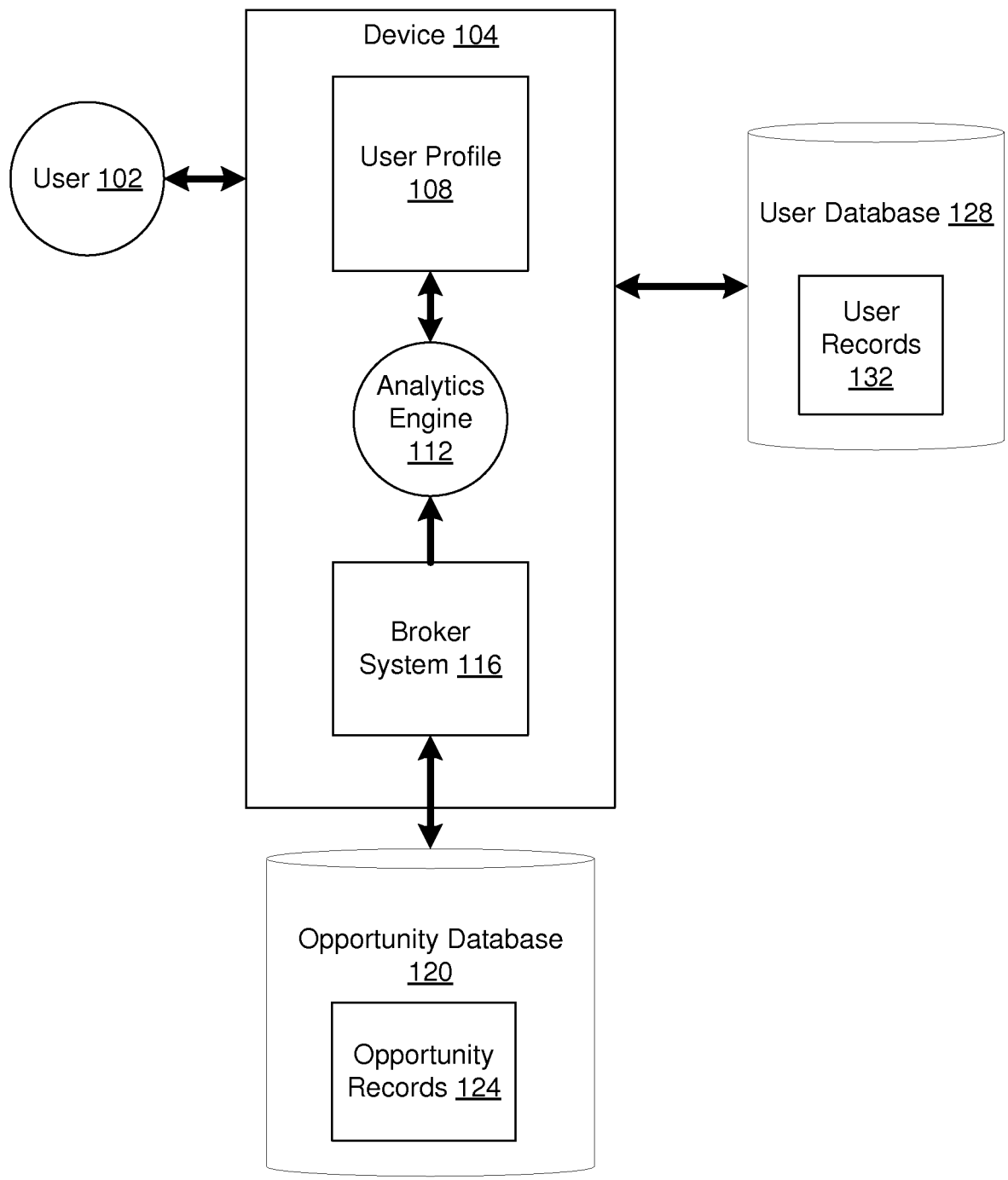
FIG. 1B is a block diagram of a second computing environment for providing securitized analytics services, according to an embodiment of the invention.

FIG. 1B is a block diagram of a computing environment 100B for providing securitized analytics services, according to an embodiment of the invention. Computing environment 100B is similar to computing environment 100A (FIG. 1A); like elements bear identical reference characters. Computing environment 100B differs from computing environment 100A in that in the former, broker system 116 is a component of device 104. However, the same principles of operation apply: user data, including user records 132 on user database 128 (which may be internal or external to device 104) are insulated from access by broker system 116.

Figure 1C:
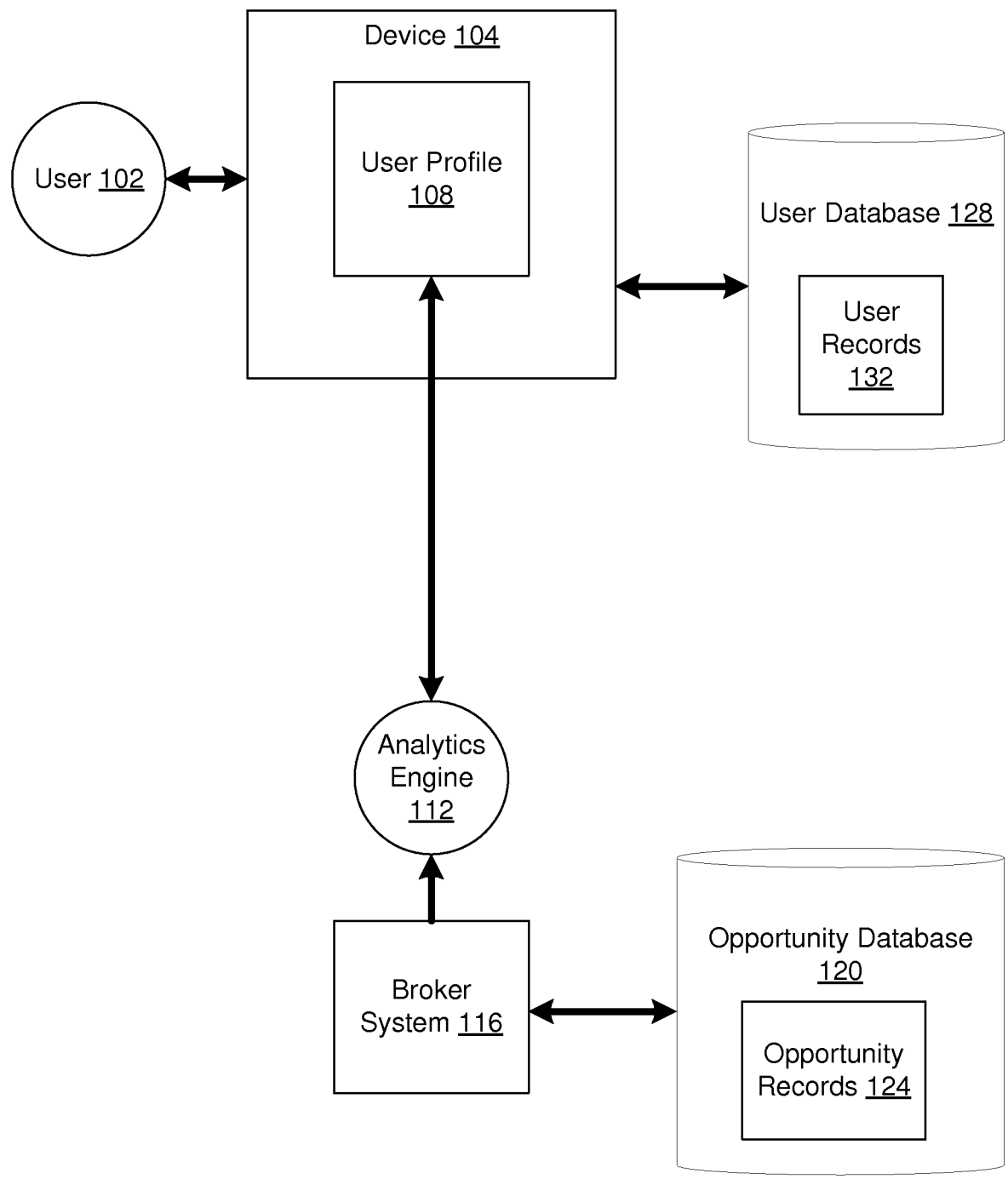
FIG. 1C is a block diagram of a third computing environment for providing securitized analytics services, according to an embodiment of the invention.

FIG. 1C is a block diagram of a computing environment 100C for providing securitized analytics services, according to an embodiment of the invention. Computing environment 100C is similar to computing environment 100A (FIG. 1A) and computing environment 100B (FIG. 1B); like elements bear identical reference characters. Computing environment 100C differs from computing environment 100A and computing environment 100B in that in the former two, analytics engine 112 is a component of device 104, whereas in computing environment 100C, analytics engine 112 is external to device 104 (the external analytics engine 112 may be separate from broker system 116 or may be part of the same underlying system). However, the same principles of operation apply: user data, including user records 132 on user database 128 (which may be internal or external to device 104) are insulated from access by broker system 116. Analytics engine 112 may receive user data, but broker system 116 may not (except as authorized).

Figure 2:
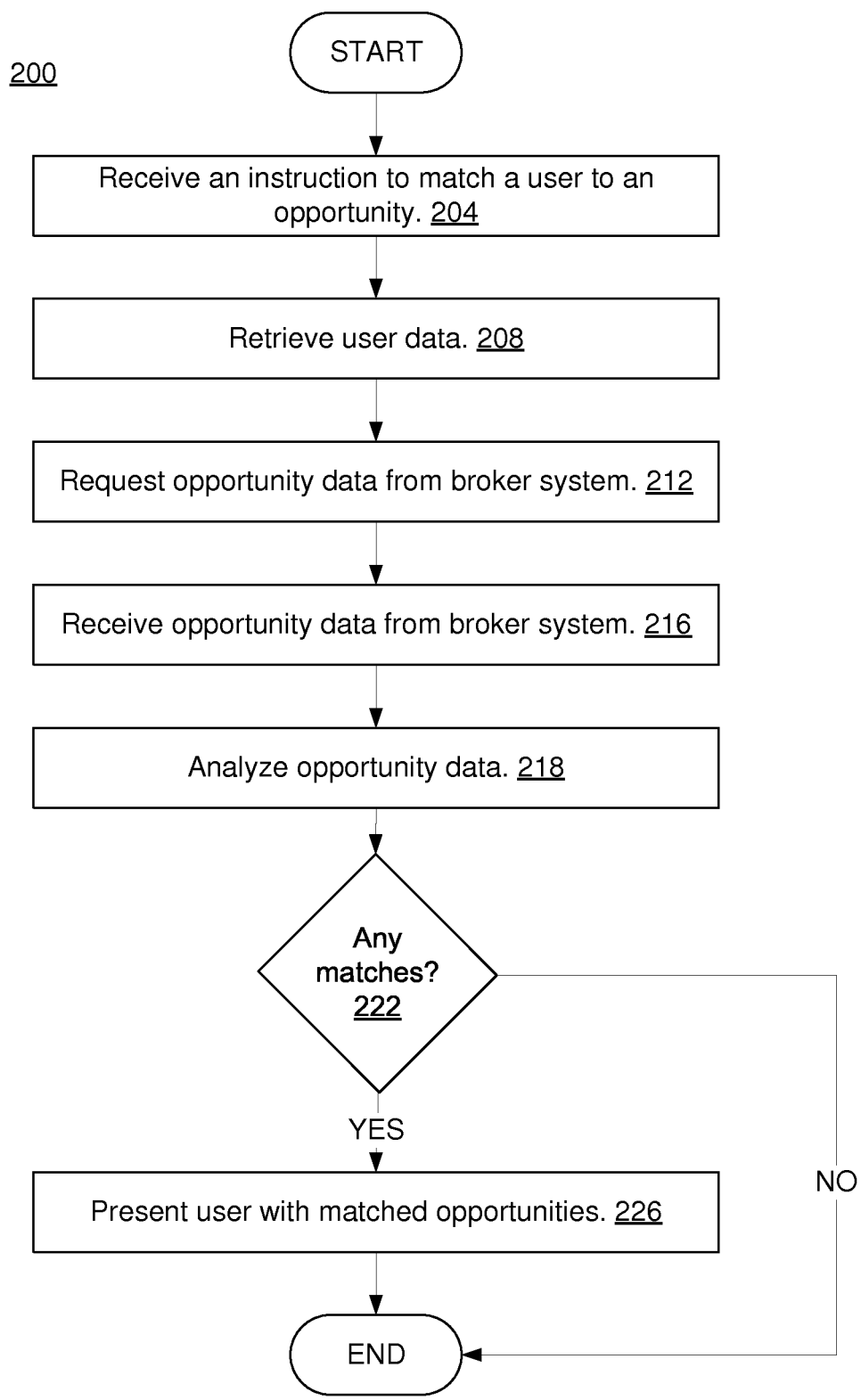
FIG. 2 is a flowchart of a method for providing securitized analytics services in the computing environment of FIG. 1A, according to an embodiment of the invention.

FIG. 2 is a flowchart of a method 200 for providing data security in analytics services in a computing environment, according to an embodiment of the invention. The computing environment may be, for example, computing environment 100A (FIG. 1A), although the method may also be implemented in computing environment 100B (FIG. 1B). Method 200 may be implemented using program instructions executable by a processor of a computer. According to an embodiment of the invention, the program instructions, the processor, and the computer, may be as described below in connection with FIG. 3, below, and may include those used in computing environment 100A.

Referring now to FIGS. 1A and 2, analytics engine 112 may receive an instruction (step 204) to provide analytics services to user 102, such as matching user 102 to one or more opportunities. For example, user 102 may issue the instruction via a user interface on device 104. The instruction may also be generated via a setting, such as a setting to match user 102 to opportunities on an interval basis or based on locations that user 102 visits, as indicated by device's 104 detected location.

Analytics engine 112 may retrieve user data (step 208), for example user profile 108 and/or user records 132 stored on user database 128, based on the received instruction. Analytics engine 112 may use the retrieved user data in other steps to match user 102 with one or more opportunities.

Analytics engine 112 may request opportunity data from broker system 116 (step 212). The request represents a generic request for opportunity data, and does not include any user data. The request, therefore, does not provide broker system 116 with any information that identifies the user, or information that specifies any user characteristics.

Consequently, broker system 116 is unable to identify user 102, except that broker system 116 may have information that identifies device 104 (for example, an IP or MAC address). However, since the request is generic, it does not reveal user information to broker system 116, except perhaps information about where the request comes from. In some embodiments of the invention, broker system's 116 access to this information does not create a concern since broker system 116 does not reveal this information to search providers (for example, Internet search engines and goods/service providers, e-commerce websites, etc.). Broker system 116 may generate many requests for each of multiple users, and it would then be computationally unfeasible to map such requests back to individual users.

Analytics engine 112 receives opportunity data (step 216) from broker system 116, in response to the request it sends to broker system 116 (step 212). The received opportunity data is generic. It represents all or a subset of the opportunity data available to broker system 116. Although broker system 116 might communicate only a subset of the opportunity data it has access to, any filtering or modification to the amount, scope, or nature of this opportunity data is done without the benefit of user data, since broker system 116 does not have access to the user data via device 104. However, it is possible that broker system 116 obtains user data from other sources (for example, from other data collections or where the user expressly grants access to user data by broker system 116).

Analytics engine 112 analyzes (step 218) the opportunity data it receives (step 216) in light of the user data it retrieves (step 208). Analyzing the opportunity data and the user data may include comparing characteristics/features of one or more opportunity records 124 to characteristics/features of user 102.

Analytics engine 112 evaluates whether any opportunity records 124 are suitable matches for user 102 (decision step 222) based on an analysis criteria. The analysis criteria may include, for example, selecting as a suitable match for user 102 an opportunity record 124 sharing a highest number of characteristics/features with those of user 102 as compared with other opportunity records 124. In another example, the suitability may be based on a number of dissimilarities. In other scenarios, broker system 116 may propose the available opportunity to a user model, composed of a multiplicity of statistical systems that abstract a user profile from public and private user data, and determine the suitability of these opportunities based on the response of the user model. Such an approach renders explicit information about the user unavailable to broker system 116. Other criteria are possible.

If analytics engine 112 finds a suitable match (YES branch), analytics engine 112 presents user 102 with matched opportunity records 124 (step 226). In one embodiment, this may take the form of a notification message sent to and displayed on device 104. If analytics engine 112 does not find a suitable match (NO branch), the method may end, or may repeat other steps.

With continued reference to FIGS. 1A and 2, a first exemplary use case of computing environment 100A and method 200 will be described. Bank A may be interested in issuing a credit card to customers, and user 102 may be interested in signing up for a new credit card. In this example, the credit card's availability is an opportunity, representable via an opportunity record 124 stored on an opportunity database 120 maintained or controlled by Bank A. The credit card's features, such as eligibility requirements (for example, a minimum credit score) and benefits (for example, a credit line cap), are stored as part of the credit card's opportunity record 124. User 102 may have associated user data (such as user profile 108 and/or user records 132 stored on user database 128) that may be useful in matching user 102 to Bank A's credit card. For example, user 102 may have a current credit score, and a preferred credit line cap.

With continued reference to the first exemplary use case, in traditional analytics services, user 102 discloses its user data to Bank A, for example, via Bank A's mobile app. Bank A will use the user data, such as user's 102 credit score and preferred credit line cap, to match user 102 to one of Bank A's credit cards. Bank A may also use user's 102 credit information for other purposes, without user's 102 knowledge or control.

On the other hand, in accordance with embodiments of the present invention, user 102 does not disclose any such information to Bank A. Rather, Bank A communicates with user 102 via broker system 116. Whether broker system 116 is controlled and operated by Bank A on Bank A's server, or controlled and operated by user 102 on device 104, broker system 116 has access to some opportunity records 132, but does not have access to user data. Therefore, broker system 116 can communicate one or more opportunity records 132, associated with Bank A's available credit cards, to analytics engine 112. Analytics engine 112, which is controlled by device 104, performs the analysis that identifies whether user 102 qualifies for one of Bank A's credit cards. In this manner, user 102 learns of the match without having to disclose confidential financial information to Bank A.

With continued reference to FIGS. 1A and 2, a second exemplary use case of computing environment 100A and method 200 will be described. Retailer A at Location 1 may be offering a discount to customers for women's fashion items on Date X. Location 1 may be an outlet mall hosting a number of retailers. User 102 may be an adult female visiting Location 1 on Date X. User's 102 purchase history may show that she has purchased discount fashion items in the past, which indicate she may be interested in the fashion items offered by Retailer A. The chance to purchase discounted fashion items is an opportunity available to user 102, and may be represented as an opportunity record 124 stored on an opportunity database controlled by Retailer A.

With continued reference to the second exemplary use case, in traditional analytics services, user 102 communicates her user data to Retailer A (or a server representing multiple retailers). Retailer A, in turn, notifies user 102 that it is offering discount fashion items.

On the other hand, in accordance with embodiments of the present invention, user 102 does not disclose any such information to Retailer A. Rather, Retailer A provides the opportunity records 124, which are associated with its discount items on offer for sale, to broker system 116. Broker system 116 provides this information to analytics engine 112, which matches user 102 to the opportunity available at Retailer A, and recommends that user 102 visit Retailer A.

Referring now generally to FIGS. 1A-C and 2, it should be noted that a feature of embodiments of the invention is that user data is insulated from access by broker system 116. It is not necessary, for accomplishment of this principle of operation, that analytics engine 112 and broker system 116 be part of any particular device, or for them to be part of the same device or different devices. It is sufficient that access control to user data (including user profile 108 and user records 132) be restricted, such that analytics engine 112 may access user data, but broker system 116 should be denied access to the data.

In some embodiments, broker system 116 may not even be aware of device 104. For example, where analytics engine 112 is external to device 104, analytics engine 112 may periodically collect opportunity data from broker system 116 (for example, retailers may regularly update opportunity data by submitting the updates to broker system 116). Broker system 116 may provide the opportunity data to analytics engine 112, without analytics engine 112 revealing for whose benefit the analytics engine 112 operates.

In some embodiments, where analytics engine 112 is external to device 104, even analytics engine 112 may not be aware of user data, and may simply forward all or a portion of the opportunity data it posses to device 104.

With continued reference to FIGS. 1A-C and 2, analytics engine 112 may submit a query to broker system 116, which may limit the opportunity data that broker system 116 returns to a subset of all the opportunity data available to broker system 116. In one example, the query may be generated based on user 102 input. The user input may include keywords that user 102 provides, or features/characteristics in user profile 108, or user records 132, that user 102 selects (via manual or automatic settings) to send to broker system 116. For example, analytics engine 112 may provide user 102 with a list of opportunity categories. User 102 may select a "fitness" category. Analytics engine 112 may request from broker system 116 that only opportunities related to fitness be provided in response to a request for opportunities. However, the principle of operation remains the same. While broker system 116 knows that analytics engine 112 has requested records of fitness opportunities, it is analytics engine 112 that matches those opportunities to user 102 (for example, based on user's 102 biometrics).

With reference now to embodiments of the invention in general, a non-limiting use-case scenario is the following: Assume that a user is interested in joining a health club. Once the user has joined a health club, the user for a period of time will not be interested in ads for other health clubs—and the user model ensures this—the user just paid the fees to the health club, so there is little point of showing health club ads to the user. However, after a while the analytical system might start showing new ads: as the current membership period is about to expire (for example, based on recurrent credit card charges). The analytical system might use the broker to identify newly opened clubs or clubs with good deals closer to the user's workplace/home that were not open or did not have promotions when the user originally looked for a health club. This is only possible if private information is used both to identify and to filter out potential opportunities.

Figure 3:
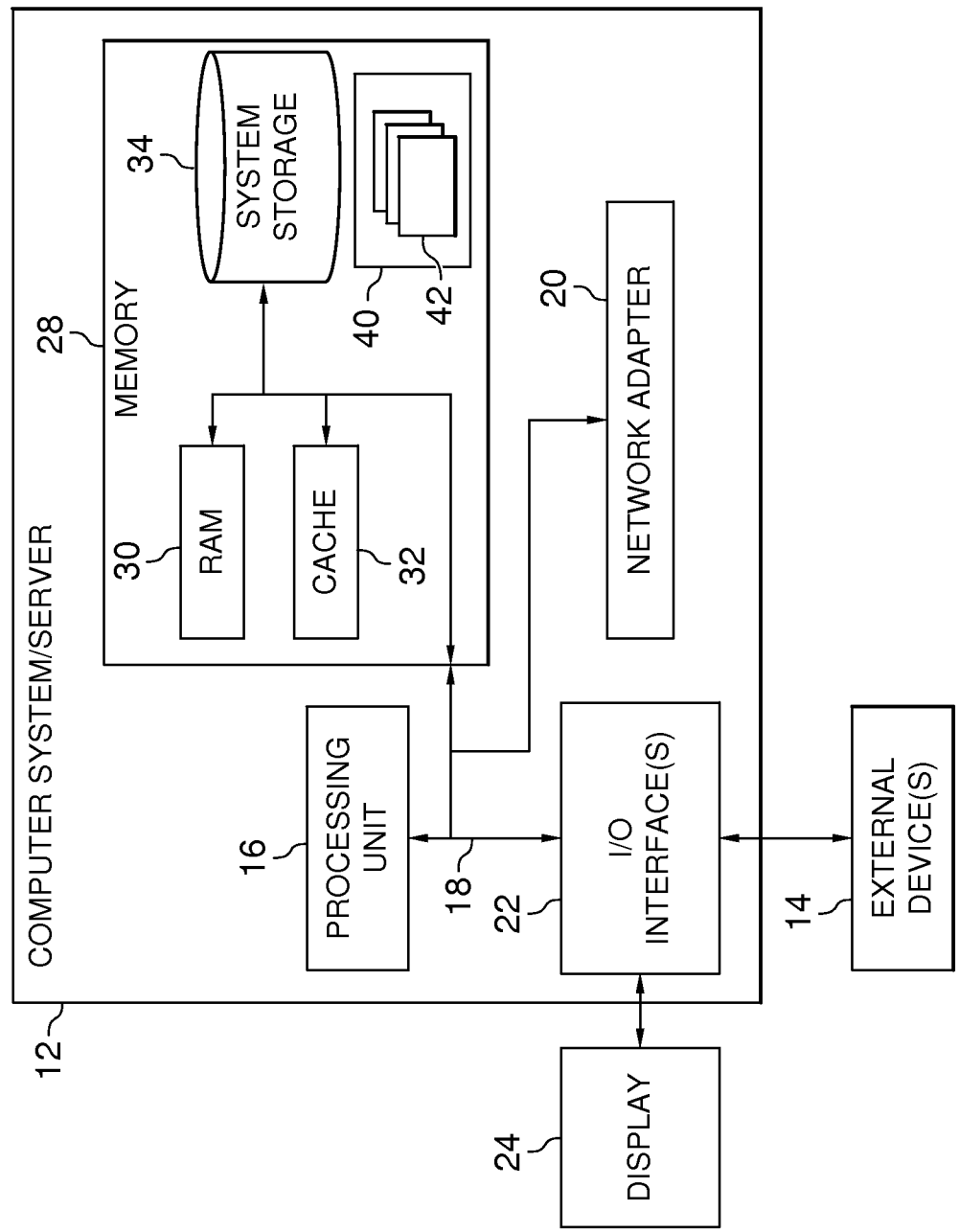
FIG. 3 is a block diagram of a computing device, according to an embodiment of the invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
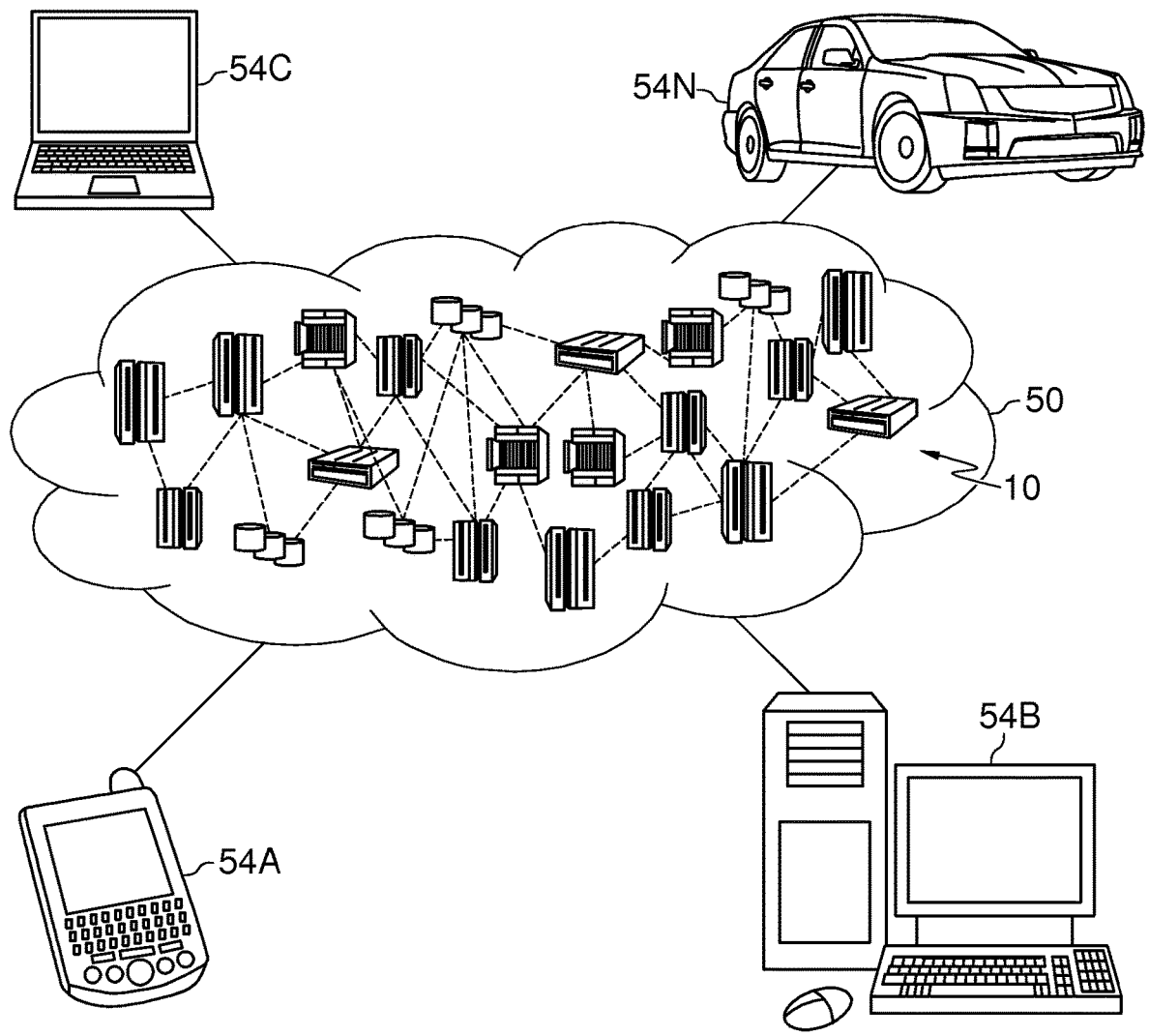
FIG. 4 is a block diagram of an illustrative cloud computing environment, according to an aspect of the invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that cloud computing nodes 10 and cloud computing environment 50 can communicate with any type of computerized device over any type of network and/or network addressable connection (e.g., using a web browser).

Figure 5:
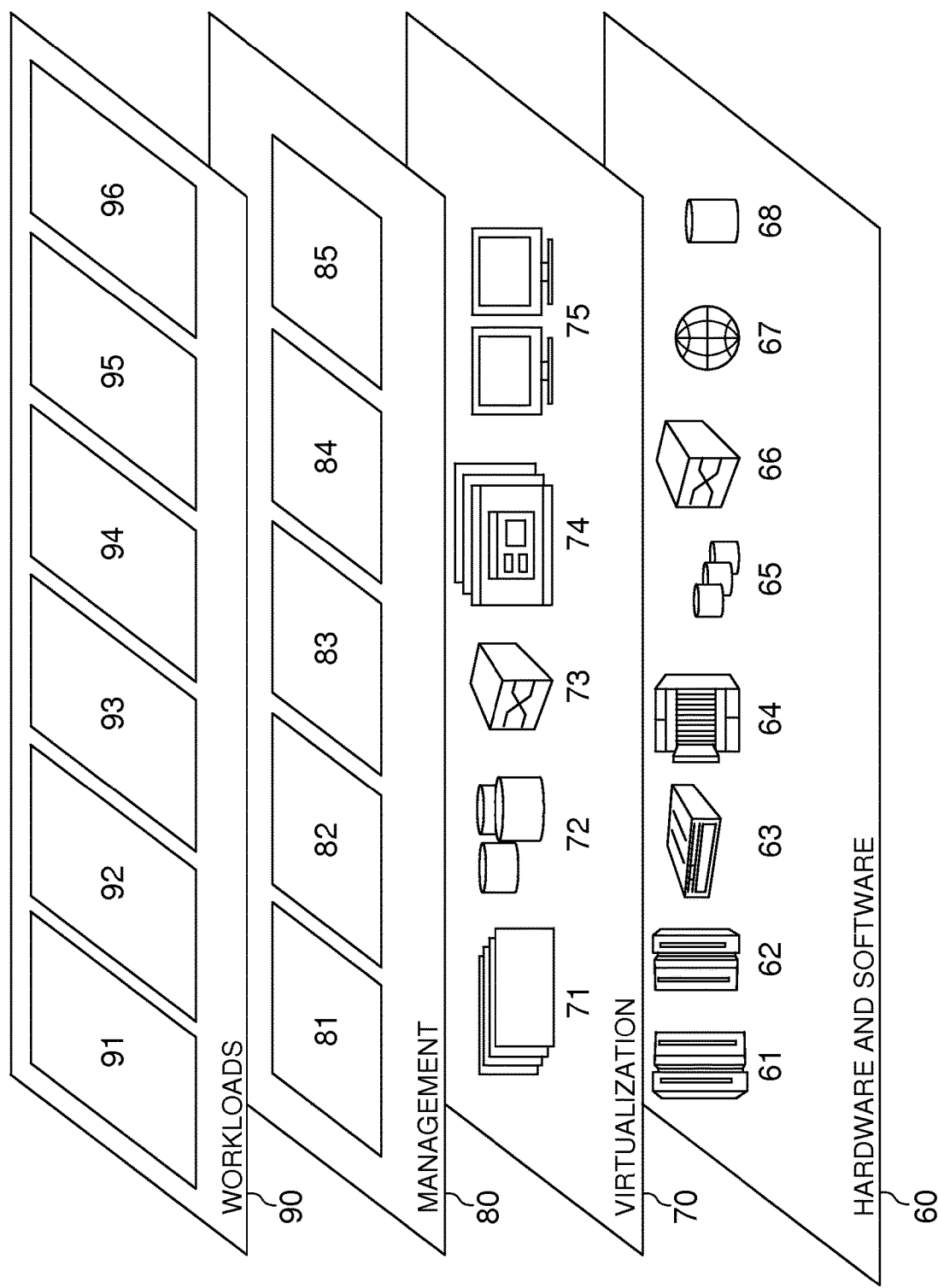
FIG. 5 is a block diagram of functional layers of the illustrative cloud computing environment of FIG. 4, according to an aspect of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; analytics services 96, including those described in connection with FIGS. 1A-C and 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for maintaining confidentiality of user data in providing analytics services to a user on a data network, comprising:

receiving, by an analytics engine, user data associated with a user, wherein the received user data is transactional information accumulated over a time period from a plurality of purchases made by the user and stored locally in a database;

communicating, by the analytics engine, a query to a broker system, wherein the query comprises data properties for use in selecting opportunity data for inclusion in the plurality of opportunity data, and wherein the broker system and the analytics engine are local components of an electronic mobile device associated with the user, wherein the analytics engine access to the user data requires key authentication, wherein the user data is quarantined from computing resources which collect opportunity data;

receiving, by the analytics engine in response to a request to a data broker system, a plurality of opportunity data sent from the broker system, wherein the plurality of opportunity data comprise one or more electronic records defined as qualifying for association with one or more users, and wherein the request sent from the analytics engine to the broker system comprises non-traceable user data, and wherein the non-traceable user data is a name of a product purchased by the user without an indication the product is associated with the user, wherein the data broker system cannot access the user data;

performing one or more analytics operations, concurrently, based on the user data and the plurality of opportunity data, wherein the one or more analytics operations include generating a user model based on the user data and matching at least one opportunity to the user based on a highest number of shared characteristics between the user data and the plurality of opportunity data reflected in the user model; and in response to the user model indicating the at least one opportunity exists, presenting the at least one opportunity to the user through a notification message displayed on the electronic mobile device.

2. The method of claim 1, wherein the one or more analytics operations comprise generating a user model based on the user data.

3. The method of claim 2, further comprising:

matching the user to at least one opportunity record in the plurality of opportunity data based on the user model.

4. The method of claim 1, wherein the analytics engine comprises program instructions executable in whole or in part on the electronic mobile device, wherein program instructions of the broker system are not executed on the electronic mobile device.

5. The method of claim 1, wherein the analytics engine is executable in whole or in part as part of a cloud computing architecture.

6. The method of claim 1, wherein at least a component of the analytics engine and at least a component of the data broker system operate on a common electronic device.

7. A computer system for maintaining confidentiality of user data in providing analytics services to a user on a data network, comprising:
- one or more computer devices each having one or more processors and one or more tangible storage devices; and
- a program embodied on at least one of the one or more storage devices, the program having a plurality of program instructions for execution by the one or more processors, the program instructions comprising instructions for:
- receiving, by an analytics engine, user data associated with a user, wherein the received user data is transactional information accumulated over a time period from a plurality of purchases made by the user and stored locally in a database;
- communicating, by the analytics engine, a query to a broker system, wherein the query comprises data properties for use in selecting opportunity data for inclusion in the plurality of opportunity data, and wherein the broker system and the analytics engine are local components of an electronic mobile device associated with the user, wherein the analytics engine access to the user data requires key authentication, wherein the user data is quarantined from computing resources which collect opportunity data;
- receiving, by the analytics engine in response to a request to a data broker system, a plurality of opportunity data sent from the broker system, wherein the plurality of opportunity data comprise one or more electronic records defined as qualifying for association with one or more users, and wherein the request sent from the analytics engine to the broker system comprises non-traceable user data, and wherein the non-traceable user data is a name of a product purchased by the user without an indication the product is associated with the user, wherein the data broker system cannot access the user data;
- performing one or more analytics operations, concurrently, based on the user data and the plurality of opportunity data, wherein the one or more analytics operations include generating a user model based on the user data and matching at least one opportunity to the user based on a highest number of shared characteristics between the user data and the plurality of opportunity data reflected in the user model; and
- in response to the user model indicating the at least one opportunity exists, presenting the at least one opportunity to the user through a notification message displayed on the electronic mobile device.

8. The system of claim 7, wherein the one or more analytics operations comprise generating a user model based on the user data.

9. The system of claim 8, the instructions further comprising instructions for:
- matching the user to at least one opportunity record in the plurality of opportunity data based on the user model.

10. The system of claim 7, wherein the analytics engine comprises program instructions executable in whole or in part on the electronic mobile device, wherein program instructions of the broker system are not executed on the electronic mobile device.

11. The system of claim 7, wherein the analytics engine is executable in whole or in part as part of a cloud computing architecture.

12. The system of claim 7, wherein at least a component of the analytics engine and at least a component of the data broker system operate on a common electronic device.

13. A computer program product for maintaining confidentiality of user data in providing secured analytics services to a user on a data network, comprising a non-transitory tangible storage device having program code embodied therewith, the program code executable by a processor of a computer to perform a method, the method comprising:
- receiving, by an analytics engine, user data associated with a user, wherein the received user data is transactional information accumulated over a time period from a plurality of purchases made by the user and stored locally in a database;
- communicating, by the analytics engine, a query to a broker system, wherein the query comprises data properties for use in selecting opportunity data for inclusion in the plurality of opportunity data, and wherein the broker system and the analytics engine are local components of an electronic mobile device associated with the user, wherein the analytics engine access to the user data requires key authentication, wherein the user data is quarantined from computing resources which collect opportunity data;
- receiving, by the analytics engine in response to a request to a data broker system, a plurality of opportunity data sent from the broker system, wherein the plurality of opportunity data comprise one or more electronic records defined as qualifying for association with one or more users, and wherein the request sent from the analytics engine to the broker system comprises non-traceable user data, and wherein the non-traceable user data is a name of a product purchased by the user without an indication the product is associated with the user, wherein the data broker system cannot access the user data;
- performing one or more analytics operations, concurrently, based on the user data and the plurality of opportunity data, wherein the one or more analytics operations include generating a user model based on the user data and matching at least one opportunity to the user based on a highest number of shared characteristics between the user data and the plurality of opportunity data reflected in the user model; and
- in response to the user model indicating the at least one opportunity exists, presenting the at least one opportunity to the user through a notification message displayed on the electronic mobile device.

14. The computer program product of claim 13, wherein the one or more analytics operations comprise generating a user model based on the user data.

15. The computer program product of claim 14, wherein the method further comprises:
- matching the user to at least one opportunity record in the plurality of opportunity data based on the user model.

16. The computer program product of claim 13, wherein the analytics engine comprises program instructions executable in whole or in part on the electronic mobile electronic device, wherein program instructions of the broker system are not executed on the electronic mobile device.

17. The computer program product of claim 13, wherein the analytics engine is executable in whole or in part as part of a cloud computing architecture.

18. The computer program product of claim 13, wherein at least a component of the analytics engine and at least a component of the data broker system operate on a common electronic device.

\* \* \* \* \*